US006646082B2

(12) United States Patent
Ghosh et al.

(10) Patent No.: US 6,646,082 B2
(45) Date of Patent: Nov. 11, 2003

(54) CORROSION INHIBITING COMPOSITIONS

(75) Inventors: Tirthankar Ghosh, Oreland, PA (US); William M. Hann, Gwynedd, PA (US); Barry Weinstein, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/234,917

(22) Filed: Sep. 4, 2002

(65) Prior Publication Data

US 2003/0065116 A1 Apr. 3, 2003

Related U.S. Application Data

(60) Provisional application No. 60/316,291, filed on Sep. 4, 2001.

(51) Int. Cl.⁷ .............................................. C08F 122/40
(52) U.S. Cl. ..................... 526/262; 526/258; 526/259; 526/264; 526/265; 526/266; 526/271; 526/288; 526/307.3; 526/317.1; 526/328.5; 526/331; 526/336; 526/342; 526/345; 526/347; 526/348
(58) Field of Search .................. 526/258, 259, 526/262, 264, 265, 266, 271, 288, 307.3, 317.1, 328.5, 331, 336, 342, 345, 347, 348

(56) References Cited

U.S. PATENT DOCUMENTS

| 4,904,360 A | * | 2/1990 | Wilson, Jr. et al. | 204/181 |
|---|---|---|---|---|
| 4,936,987 A | | 6/1990 | Persinski et al. | 210/699 |
| 4,973,409 A | | 11/1990 | Cook | 210/699 |
| 5,382,667 A | | 1/1995 | Wilhelm et al. | 544/141 |
| 5,391,636 A | | 2/1995 | Schilling | 525/381 |
| 5,556,575 A | | 9/1996 | Babaian-Kibala et al. | 252/394 |
| 5,807,612 A | * | 9/1998 | Bell et al. | 427/388.4 |

FOREIGN PATENT DOCUMENTS

| WO | WO 00/66810 | 11/2000 | ........... C23F/11/10 |
|---|---|---|---|
| WO | WO 01/42149 A1 | 6/2001 | ............. C02F/5/12 |

OTHER PUBLICATIONS

Zhang et al. Polymer Engineering and Science (1999), 39(1), 119–127.*

Agarwal et al. Journal of Applied Polymer Science (2000), 76(6), 875–885.*

* cited by examiner

*Primary Examiner*—Helen L. Pezzuto
(74) *Attorney, Agent, or Firm*—Stephen E. Johnson

(57) ABSTRACT

A new class of polymeric corrosion inhibiting compositions incorporating pendant heterocyclic groups which are surprisingly effective copper corrosion inhibitors are disclosed. The polymers form a protective barrier on metallic components to aqueous systems and remain substantive on metallic surfaces over a wide pH range. Moreover, the polymers are resistant to oxidizing biocides, and are substantially impervious to repeated or prolonged exposure to corrosive agents.

10 Claims, No Drawings

CORROSION INHIBITING COMPOSITIONS

CROSS REFERENCE TO RELATED PATENT APPLICATIONS

This is a non-provisional application of prior pending U.S. provisional application Ser. No. 60/316,291 filed Sep. 4, 2001.

The present invention relates to compositions which inhibit corrosion of metals in contact with aqueous and non-aqueous systems. More particularly, the invention is directed to introducing oligomeric and polymeric compositions as fluid additives in aqueous systems that are effective corrosion inhibitors over a wide range of pH and render metals passive to repeated attack by oxidants and oxidizing biocides. In addition, the invention relates to anti-corrosive coating compositions applied to metallic components.

Metallic components used in industrial processes and heating ventilation and air conditioning (HVAC) operations that are in contact with fluid media such as, for example, cooling water experience three major problems: metal corrosion, deposition of solids and the growth of microorganisms. The three problems are interrelated in that the ability to control one problem often influences the ability to effectively control the remaining problems. The most common method to address the problems is to add a combination of chemical agents and corrosion inhibitors to the fluid media in contact with the metallic components. Polymeric dispersants and phosphonates are commonly used to inhibit the deposit of solids referred to as scale. Biocidal compositions, in particular oxidizing biocides such as chlorine or bromine, are often used to control the deposition and growth of microorganisms. The most challenging problem in the development of new anti-corrosive compositions is providing effective chemical agents which inhibit corrosion and which do not produce an adverse environmental impact themselves or upon treatment with oxidizing biocides.

Corrosion may be defined as the gradual weight loss of a metallic component through some chemical process or series of chemical reactions. Metals in contact with aqueous systems such as sea water, fresh water and brackish water and exposed to oxidants contained therein such as chlorine, acid, bleach, caustic and dissolved oxygen are prone to corrosion. Metal alloys incorporating one or more corrosion resistant metals (e.g. Ti, Cr, Ni) are one means of improving corrosion resistance. However, such alloys are costly, difficult to process and manufacture, and experience problems with corrosion at joints, welds, and under repeated exposure to corrosive agents. Inorganic compositions such as chromates, phosphates and zinc compositions and organic compositions such as tolyltriazole (TTA) and benzotriazole (BZT) are corrosion inhibitors applied to metals or added to fluids in contact with metal components which inhibit or slow down the rate of metal corrosion. Azoles, for example, are film forming compositions that adsorb to metallic surfaces and provide a barrier to contact with an aqueous system. The effectiveness of a particular composition is usually a trade off of its anti-corrosion properties as compared to its inherent limitations such as cost, long term performance and environmental impact. Since metal corrosion occurs under a variety of environmental conditions, specific inhibitor compositions have been developed to provide corrosion resistance for specific situations.

A common corrosion inhibitor for metals are film forming azoles such as tolyltriazole (TTA) and benzotriazole (BZT). TTA has been usefully employed as a corrosion inhibitor for metallic components manufactured from copper and copper alloys. When such metals protected with TTA films are exposed to oxidizing biocides such as chlorine, however, the corrosion protection breaks down. After breakdown, it is difficult to form new protective films in TTA treated aqueous systems that are periodically or continuously chlorinated. Very high dosages of TTA are frequently applied in an attempt to improve performance, often with limited success. Other problems associated with combining triazoles and oxidizing biocides in aqueous systems include by-products that are less effective corrosion inhibitors, by products which are volatile and that have objectionable odors and halogen containing by products that are toxic to the environment if released from the aqueous system. Moreover, it is believed that the decomposition product of TTA may be more toxic than TTA, which itself is toxic to fish populations. Under the conditions found in cooling water treatment equipment, the decomposition product of TTA is believed to be an N-chlorinated compound, which is relatively volatile and susceptible to removal by stripping in the cooling tower, further reducing the levels of corrosion inhibitor and oxidizing biocide in the system.

When copper containing metals corrode, excessive concentrations of copper are released and subsequently discharged in to rivers that often serve as reservoirs of cooling water. The toxic effects of copper on fish populations and other organisms in aqueous ecosystems is well established. In addition, excessive concentrations of copper ions can redeposit on mild steel components, setting up a galvanic oxidation-reduction couple leading to severe metal pitting.

U.S. Pat. No. 5,391,636 discloses polyamine condensates of styrene/maleic anhydride copolymers as corrosion inhibiting compositions. The corrosion inhibiting effects of the copolymers are primarily due to their ability to form films on metal surfaces. However, such compositions are only effective at inhibiting corrosion of metal surfaces exposed to highly acidic aqueous environments (i.e. pH values <1). Accordingly, it would be desirable to provide new corrosion inhibiting compositions that form effective barriers between metallic surfaces and aqueous systems over a wide range of pH, that are resistant to oxidizing biocides and that have minimal environmental impact.

The inventors recognized a need to provide polymeric compositions having substantive film forming ability that are effective corrosion inhibitors over a wide pH range in aqueous and non-aqueous systems and that can withstand repeated and prolonged chemical attack by oxidizing biocides such as chlorine. The inventors discovered a new class of polymeric corrosion inhibiting compositions incorporating pendant heterocyclic groups which are surprisingly effective copper corrosion inhibitors and remain substantive on metallic surfaces over a wide pH range in aqueous and non-aqueous systems, are resistant to oxidizing biocides, and are substantially impervious to repeated or prolonged exposure to corrosive agents.

The present invention provides a polymer comprising one or more repeating units selected from a functionalized imide component of Formula Ia, a functionalized amide component of Formula Ib and combinations of Formulas Ia and Ib:

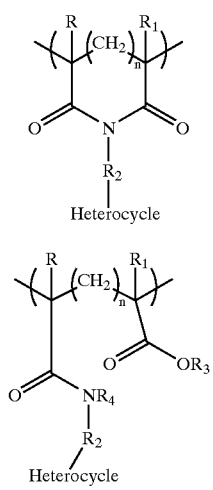

Formula Ia

Formula Ib wherein n is 0 or 1; R and $R_1$ are independently selected from hydrogen, methyl, and $C_2$–$C_4$ alkyl; $R_2$ is selected from $C_1$–$C_8$ branched and straight chain alkyl groups, $C_2$–$C_8$ branched and straight chain alkenyl groups, $C_3$–$C_8$ cyclic alkyl groups, $C_6$–$C_{10}$ unsaturated acyclic, cyclic and aromatic groups, $C_2$–$C_4$ alkylene oxide groups and poly ($C_2$–$C_4$ alkylene)m oxides, wherein m=2–20; a pendant heterocycle which comprises unsaturated or aromatic heterocycles having one or more hetero atoms selected from N, O, S and combinations thereof, the pendant heterocycle chemically bonded to $R_2$ via a hetero atom which is part of the pendant heterocycle or a carbon atom of the pendant heterocycle; $R_3$ is selected from hydrogen, methyl, ethyl, $C_3$–$C_{18}$ branched and straight chain, alkyl and alkenyl groups; and $R_4$ is selected from H, $CH_3$, $C_2H_5$, $C_6H_5$ and $C_3$–$C_{18}$ branched or straight chain alkyl and alkenyl groups.

Accordingly, the present invention provides a corrosion inhibiting polymer comprising:
i) at least one repeating unit selected from a functionalized imide component of Formula Ia, a functionalized amide component of Formula Ib and combinations of Ia and Ib;
ii) at least one ethylenically unsaturated monomer component selected from maleic anhydride, itaconic anhydride, cyclohex-4-enyl tetrahydrophthalic anhydride, and monomers of Formula II:

$$CH(R5)=C(R6)(R7)$$ Formula II wherein $R_5$ is selected from hydrogen, phenyl, methyl, ethyl, $C_3$–$C_{18}$ branched and straight chain alkyl and alkenyl groups; $R_6$ is independently selected from hydrogen, methyl, ethyl, phenyl, $C_3$–$C_{18}$ branched and straight chain alkyl and alkenyl groups, $OR_8$ and $CH_2OR_8$ groups wherein $R_8$ is acetate, glycidyl, methyl, ethyl, $C_3$–$C_{18}$ branched and straight chain alkyl and alkenyl groups, and groups having the formula $[CH_2CH(R_a)O]_mR_b$ wherein $R_a$ is hydrogen, methyl, ethyl, and phenyl, m is an integer from 1–20 and $R_b$ is independently hydrogen, methyl, ethyl, phenyl and benzyl; and $R_7$ is independently selected from H, $CH_3$, $C_2H_5$, CN, a $COR_9$ group wherein $R_9$ is OH, $NH_2$, $OR_8$ group wherein $R_8$ is a group described previously and a $NR_cR_d$ group wherein $R_c$ and $R_d$ are the same group or different groups, are parts of a 5-membered or 6-membered ring system, hydrogen, hydroxymethyl, methoxy methyl, ethyl and $C_3$–$C_{18}$ branched and straight chain alkyl and alkenyl groups branched and straight chain alkyl and alkenyl groups; and
iii) optionally one or more end groups selected from initiator fragments, chain transfer fragments, solvent fragments and combinations thereof.

Alternatively, the corrosion inhibiting polymer comprises a composition of Formula III:

$$(A)x(B)y(C)z$$ Formula III wherein A is an optional end group component selected from initiator fragments, chain transfer fragments, solvent fragments and combinations thereof; wherein B is a functionalized imide component of Formula Ia, a functionalized amide component of Formula Ib and combinations of Ia and Ib; wherein C is an ethylenically unsaturated monomer component selected from maleic anhydride, itaconic anhydride, cyclohex-4-enyl tetrahydrophthalic anhydride, and monomers of Formula II; and wherein x, y, z are integers values chosen such that (y+z)/x is greater than 2.

The present invention also provides a corrosion inhibiting polymer comprising a composition of Formula III:

$$(A)x(B)y(C)z$$ Formula III wherein A is an end group component selected from initiator fragments, chain transfer fragments, solvent fragments and combinations thereof; wherein B is a functionalized imide component of Formula Ia selected from succinimide, glutarimide and combinations thereof; wherein C is an ethylenically unsaturated monomer component selected from maleic anhydride, itaconic anhydride, cyclohex-4-enyl tetrahydrophthalic anhydride, and monomers of Formula II; and wherein x, y, z are integers values chosen such that (y+z)/x is greater than 2.

The present invention also provides a corrosion inhibiting polymer comprising:
i) one or more end groups selected from initiator fragments, chain transfer fragments, solvent fragments and combinations thereof;
ii) at least one repeating unit selected from a functionalized imide component of Formula Ia, a functionalized amide component of Formula Ib and combinations of Ia and Ib; and
iii) at least one unit selected from a functionalized imide component or a functionalized amide component selected from succinimide, glutarimide and combinations thereof, wherein the nitrogen atom of each component of B' is chemically bonded to a group selected from $C_1$–$C_{18}$ branched or straight chain alkyl, $C_1$–$C_{18}$ alkyl or alkenyl substituted aryl, which is in turn chemically bonded to a pendant functional group selected from an amine group, amide group, carboxylic acid group, alcohol group or a group having the formula $[CH_2CH(R_a)O]_mR_b$ wherein $R_a$ is hydrogen, methyl, ethyl, and phenyl, m is an integer from 2–20 and $R_b$ is independently hydrogen, methyl, ethyl, phenyl and benzyl.

Alternatively, the corrosion inhibiting polymer comprises a composition of Formula IV:

$$(A)x(B)y(B')z$$ Formula IV wherein A is an end group selected from initiators fragments, chain transfer fragments, solvent fragments and combinations thereof; wherein B is a functionalized imide component of Formula Ia selected from succinimide, glutarimide and combinations thereof; wherein B' includes at least one unit selected from a functionalized imide component or a functionalized amide component selected from succinimide, glutarimide and combinations thereof, wherein the nitrogen atom of each component of B' is chemically bonded to a group selected from $C_1$–$C_{18}$ branched or straight chain alkyl, $C_1$–$C_{18}$ alkyl or alkenyl substituted aryl, which is in turn chemically bonded to a pendant functional group selected from an amine group, amide group, carboxylic acid group, alcohol group or a group having the formula [$CH_2CH(R_a)O]_mR_b$ wherein $R_a$ is hydrogen, methyl, ethyl, and phenyl, m is an integer from 2–20 and $R_b$ is independently hydrogen, methyl, ethyl, phenyl and benzyl; and wherein x, y, z are integers values chosen such that (y+z)/x is greater than 2.

The present invention provides a corrosion inhibiting formulation including one or more corrosion inhibiting polymer compositions and one or more additives selected from the group consisting of biocidal compositions, corrosion inhibiting compositions different from those of the present invention, scale inhibiting compositions, dispersants, defoamers, inert tracers and combinations thereof.

Accordingly, the present invention provides corrosion inhibiting compositions for metallic components used in the manufacture of commercial equipment associated with aqueous and non-aqueous systems that require corrosion protection. "Aqueous system" refers to any system containing metallic components which contain or are in contact with aqueous fluids on a periodic or continuous basis. The term "aqueous fluids" refers to fluids containing 5 weight percent or more water and includes water-based fluids. Water based fluids refer to fluids containing a minimum of 40 percent by weight water, the remainder being suspended and/or dissolved solids and compounds that are soluble in water. "Non-aqueous system" refers to any system containing metallic components which contain or are in contact with non-aqueous fluids on a periodic or continuous basis. Non-aqueous fluids may be miscible or immiscible in water.

Typical aqueous systems include, for example, recirculating cooling units, open recirculating cooling units that utilize evaporation as a source of cooling, closed loop cooling units, heat exchanger units, reactors, equipment used for storing and handling liquids, boilers and related steam generating units, radiators, flash evaporating units, refrigeration units, reverse osmosis equipment, gas scrubbing units, blast furnaces, paper and pulp processing equipment, sugar evaporating units, steam power plants, geothermal units, nuclear cooling units, water treatment units, food and beverage processing equipment, pool recirculating units, mining circuits, closed loop heating units, machining fluids used in operations such as for example drilling, boring, milling, reaming, drawing, broaching, turning, cutting, sewing, grinding, thread cutting, shaping, spinning and rolling, hydraulic fluids, cooling fluids, oil production units and drilling fluids. Typical examples of aqueous fluids include fresh water, brackish water, sea water, waste water, mixtures of water and salts (known as brines), mixtures of water and alcohol such as methanol, ethanol and ethylene glycol, mixtures of water and acids such as mineral acids, mixtures of water and bases such as caustic and combinations thereof. Aqueous systems treated using the compositions of this invention may contain dissolved oxygen or may contain no oxygen. The aqueous systems may contain other dissolved gases such as, for example, carbon dioxide, ammonia and hydrogen sulfide.

In the descriptions that follow, the terms oligomer, polymer and co-polymer are used. Oligomer refers to compositions produced by the polymerization of one or more monomer units wherein the number of monomer units incorporated in the oligomer are between 2 and about 10. Polymer refers to compositions produced by the polymerization of one or more monomer units with no restriction on the number of types of monomer units incorporated in the polymer. Co-polymer refers to compositions produced by the polymerization of two different monomer units with no restriction on the number of either monomer units incorporated in the co-polymer.

The metallic components in contact with the aqueous system are processed from any metal for which corrosion and/or scaling can be prevented. Typical examples of metals requiring corrosion protection are copper, copper alloys, aluminum, aluminum alloys, ferrous metals such as iron, steels such as low carbon steel, chromium steel and stainless steel, iron alloys and combinations thereof.

Different types of metal corrosion are encountered in aqueous systems such as, for example, uniform corrosion over the entire metal surface and localized corrosion such as pitting and crevice forming. Often, control of localized corrosion may be the critical factor in prolonging the useful life of the metal components in contact with the aqueous system. Aqueous systems containing significant concentrations (also referred to as "levels") of anions such as chloride and sulfate are prone to both uniform and localized corrosion. These anions are often present in the aqueous fluids used in the system. Uniform and localized corrosion often result in the failure of the metallic components requiring replacement or extensive repairs and maintenance, both shutting down operation of the aqueous system. Therefore, the present invention provides polymeric compositions for inhibiting corrosion in aqueous systems.

The corrosion resistant polymer compositions usefully employed in the present invention are substantially resistant or impervious to oxidizing biocides including for example oxidants such as oxygen, ozone and hydrogen peroxide, halogens such as chlorine, bromine, and iodine, combinations of oxidants such as NaOCl and alkali salts of Group VII (Group 17 according to the nomenclature of the International Union of Pure and Applied Chemists) elements, organic compounds such as hydantinoids, cyanuric acid derivatives, substituted cyanuric acid derivatives such as chloro cyanuric acid, alkali and alkaline earth salts of cyanuric acid and cyanuric acid derivatives, and combinations thereof. In addition, the anti-corrosive compositions are substantially resistant or impervious to repeated and prolonged exposure to corrosive agents including for example chlorine, bromine, and iodine; hypochlorite and its alkali metal salts such as sodium hypochlorite; hypochloric acid; chlorous acid; mineral acids such as hydrochloric acid, sulfuric acid and phosphoric acid; perchloric acid, basic compounds such as lye, caustics, bleaches, and ammonia; reducing agents such as sulfides, sulfites and alkali metal sulfides; and combinations thereof.

The corrosion inhibiting compositions of the present invention are effective in highly acidic or basic aqueous systems, namely at pH between 0.5 and 14. It is preferred that the corrosion inhibiting compositions are added to the aqueous systems at pH between 6 and 10.

All polymers and corrosion inhibiting polymer compositions usefully employed in the present invention include at least one repeating unit selected from a functionalized imide component having Formula Ia, a functionalized amide component having Formula Ib and combinations of Formulas Ia and Ib:

Formula Ia Formula Ib

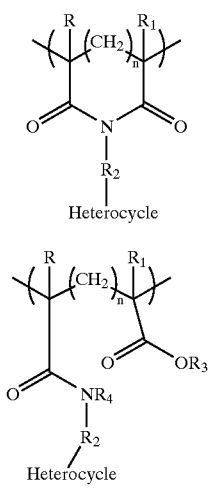

Formula Ia

Formula Ib

Preferably n is 0. Preferably R and $R_1$ are hydrogen. Preferably $R_2$ is selected from $C_2$–$C_8$ branched and straight chain alkyl groups. Preferably, $R_3$ is selected from $C_3$–$C_{18}$ branched and straight chain alkyl groups. Preferably, Preferably, $R_4$ is selected from $C_3$–$C_{18}$ branched and straight chain alkyl groups.

Suitable heterocycles usefully employed in accordance with the invention include for example 5 to 7-membered heterocycles having some degree of unsaturation, aromatic heterocycles having at least one hetero atom selected from N, O or S atoms, their respective isomers and combinations thereof. The heterocycle is chemically bonded to the $R_2$ group via a hetero atom which is part of the heterocycle or a carbon atom of the heterocycle. In addition, suitable heterocycles include for example 5 to 7-membered heterocycles that are fused together to form larger 9 to 14-membered heterocycles having more than one type or combination of N, O or S atoms, isomers of such heterocycles and combinations thereof.

Preferred heterocyclic groups include for example imidazole, thiophene, pyrrole, oxazole, thiazoles and their respective isomers such as thiazol-4-yl, thiazol-3-yl and thiazol-2-yl, pyrazole, substituted thiazoles and their respective isomers such as 2-amino thiazol-4-yl, tetrazole, pyridine, pyridazine, pyrimidine, pyrazine, azoles, indazoles, triazoles and their respective isomers such as 1, 2, 3-triazole, 1,2,4-triazole, and combinations thereof.

The nitrogen atom constituting the functionalized imide components and functionalized amide components of B further is chemically bonded to a $R_2$ group, which in turn is chemically bonded to an atom that constitutes the pendant heterocycle. In an embodiment wherein the corrosion inhibiting composition is oligomeric or polymeric, the functionalized imide components and functionalized amide components are incorporated in to the backbone of the oligomer or polymer and further include a pendant heterocyclic group.

Preferred $R_2$ groups include for example $C_3$–$C_8$ branched alkyl groups such as isopropyl, isobutyl, isopentyl, neopentyl, isoamyl and isooctyl; $C_1$–$C_8$ straight chain alkyl groups such as ethyl, propyl, butyl, pentyl, hexyl, heptyl and octyl, $C_2$–$C_8$ branched alkenyl groups such as 2-methyl-but-3-enyl; $C_1$–$C_8$ straight chain alkenyl groups such as but-2-enyl and pent-3-enyl; $C_7$–$C_{10}$ cyclic unsaturated groups such 2-methyl-cyclohex-3-enyl; $C_6$–$C_{10}$ aromatic groups such as phenyl, benzyl, tolyl, and tolyl isomers such as methylbenzyl, dimethylbenzyl, xylenyl and xylenyl isomers; $C_3$–$C_8$ cyclic alkyl such as 2-methyl 1,4-cyclohexyl; poly ($C_2$–$C_4$ alkylene) oxide such as poly(ethylene oxide), poly (propylene oxide), poly(butylene oxide) and mixtures thereof.

In a separate embodiment, the nitrogen atom constituting the functionalized imide components and functionalized amide components of B' is chemically bonded to a group selected from $C_1$–$C_{18}$ branched or straight chain alkyl, $C_1$–$C_{18}$ alkyl or alkenyl substituted aryl, which is in turn chemically bonded to a pendant functional group selected from an amine group, amide group, carboxylic acid group, alcohol group or a group having the formula $[CH_2CH(R_a)O]_mR_b$ wherein $R_a$ is hydrogen, methyl, ethyl, and phenyl, m is an integer from 2–20 and $R_b$ is independently hydrogen, methyl, ethyl, phenyl and benzyl. Preferred examples include $C_1$–$C_{25}$ alkyl amines such as butyl amine, hexyl amine, octyl amine, decyl amine, dodecyl amine and stearyl amine; octyl amine; and $C_1$–$C_{25}$ alkyl amides such as hexyl amide, n-octyl amide, decyl amide and stearyl amide.

Accordingly, this invention provides a corrosion inhibiting polymer comprising chemical components A, B and C; wherein A optionally includes one or more end groups selected from initiator fragments, chain transfer fragments, solvent fragments and combinations thereof; wherein B includes at least one repeating unit selected from a functionalized imide component of Formula Ia, a functionalized amide component of Formula Ib and combinations of Ia and Ib; and wherein C represents at least one ethylenically unsaturated monomer component of Formula II. The components A, B and C are arranged randomly within the polymer and can be arranged sequentially in accordance with the invention.

Component A includes for example any initiator fragment derived from any initiator useful in initiating free radical addition polymerization. Such initiator fragments include, but are not limited to, peroxyesters, such as t-butylperbenzoate, t-amylperoxybenzoate, t-butylperoxy-2-ethylhexonate, butylperacatate and t-butylperoxylmaleic acid; dialkylperoxides such as di-t-butylperoxide, dicumylperoxide and t-butylcumylperoxide; diacylperoxides such as benzoylperoxide, lauroylperoxide and acetylperoxide; hydroperoxides such as cumene hydroperoxides and t-butylhydroperoxide; azo compounds such as azonitriles, azaamidines, cyclic azoamidines, alkylazo compounds such as azodi-tert-octane.

Component A further includes for example end groups resulting from any chain transfer agent used in controlling the molecular weight of a free radical polymerization. Suitable chain transfer agents include but are not limited to alcohols, alkyl and aromatic thiols, alkyl phosphites, aryl phosphinic acids, alkyl phosphinic acids, hypophosphites, aldehydes, formates, alkylhalides and alkyl aromatic such as toluene, xylenes, and C9–10 alkylaromatics such as Aromatic 100.

Component B refers to more than one of either a functionalized imide component or a functionalized amide component having respective Formulas Ia and Ib. Preferred B components are selected from succinimide, glutarimide and combinations thereof. The nitrogen atom that constitute the imide or amide portion of component B is chemically bonded to at least one atom of a $R_2$ group which in turn is chemically bonded to a pendant heterocycle. $R_2$ groups consisting of 2 to 8 consecutive atoms between the nitrogen atom of the imide or amide portion of B and the heterocycle are more preferred. $R_2$ groups consisting of 3 to 6 consecutive atoms between the imide or amide portion of B and the heterocycle are most preferred.

Component C includes ethylenically unsaturated monomers of Formula II. Examples of suitable monomers include (meth)acrylic acid, methyl (meth)acrylate, hydroxy (meth)acrylate, 2-hydroxyethyl acrylate, 2-hydroxy propyl acrylate, butyl (meth)acrylate, 2-ethylhexyl acrylate, decyl acrylate, lauryl (meth)acrylate, isodecyl (meth)acrylate, hydroxyethyl (meth)acrylate, and hydroxypropyl (meth)acrylate; cyclic anhydrides such as maleic anhydride; anhydrides such as itaconic anhydride, and cyclohex-4-enyl tetrahydrophthalic anhydride; olefins such as ethylene, propylene, butylene, isobutylene, di-isobutylene, d-limonene; olefin oligomers such as propylene tetramer ($C_{12}$–$C_{14}$) and propylene dimer trimer ($C_{18}$–$C_{22}$); α-olefins such as 1-butene, 1-octene and 1-decene, 1-dodecene, 1-tetradecene, 1-hexadecene, 1-octadecene, Gulftene® 20–24, Gulftene® 24–28; styrene, and substituted styrenes such as α-methyl styrene, α-methylstyrene, 4-hydroxystyrene, styrene sulfonic acid; butadiene; vinyl acetate, vinyl butyrate and other vinyl esters; and vinyl monomers such as vinyl chloride, vinylidene chloride; vinyl ethers such as methyl vinyl ether, ethyl vinyl ether, propyl vinyl ether, butyl vinyl ether, isobutyl vinyl ether; allyl ethers such as allyl ether, allyl ethyl ether, allyl butyl ether, allyl gylcidyl ether, allyl carboxy ethyl ether; ethoxy vinyl ethers such as vinyl-2-(2-ethoxy-ethoxy)ethyl ether, methoxyethoxy vinyl ether, vinyl acetate, vinylformamide and vinylacetamide, stilbene; divinyl benzene; (meth)acrylic monomers such as (meth)acrylate esters, (meth)acrylamides, and (meth)acrylonitrile. The use of the term "(meth)" followed by another term such as acrylate or acrylamide, as used throughout the disclosure, refers to both acrylates or acrylamides and methacrylates and methacrylamides, respectively. Preferred monomers of component C include ethylene, propylene, isobutylene, di-isobutylene, propylene tetramer ($C_{12}$–$C_{14}$), and propylene dimer trimer ($C_{18}$–$C_{22}$).

The corrosion inhibiting compositions usefully employed in the present invention have weight average molecular weights that range from 400 to 20,000. More preferred are compositions having weight average molecular weights that range from 400 to 10,000. Most preferred are compositions having weight average molecular weights that range from 400 to 5,000. Weight average molecular weights of the polymeric compositions were measured by GPC techniques using styrene as standard.

Polymers usefully employed according to the invention can be prepared by conventional emulsion, solution or suspension polymerization, including those processes disclosed in U.S. Pat. No. 4,973,409. Solution polymerization is preferred.

The polymerization of monomers is performed in a suitable solvent and in the presence of an initiator. Suitable solvents include for example water, dioxane, ketones such as 4-methylbutan-2-one, aromatic hydrocarbons such as toluene, xylene and xylene isomers, alcohols such as methanol and ethanol and ethers such as dioxane. Suitable reaction initiators include for example azo(bis)isobutyronitrile (AIBN), organic peroxides such as benzoyl peroxide, di-t-butyl peroxide, hydroperoxides such as t-butyl hydroperoxide and t-amyl hydroperoxide, hydrogen peroxide, sodium perborate, alkali metal persulfates and ammonium persulfate.

The corrosion inhibiting polymer compositions are easily prepared in two steps. The first step includes for example polymerization of one or more monomers such as maleic anhydride with one or more ethylenically unsaturated monomer units of C such as di-isobutylene. The anhydride portion of the resulting co-polymer is then converted via one or more post polymerization functionalization reactions such as condensation, amidation, imidation, or esterification to afford polymer compositions of Formula 1a or 1b. Alternatively, the compositions are easily prepared by polymerizing one or more functionalized monomer units of B with one or more ethylenically unsaturated monomer units of C to afford polymer compositions of Formula 1a or 1b.

The polymer products of either process for the purpose of isolation may be subjected to partial or complete evaporation under reduced pressure. The unpurified reaction products may be used as the polymer composition of the present invention. The reaction products may also be purified. The pruification procedure consists of: a) evaporation of reaction solvent and washing with a water immiscible organic solvent such as ether, followed by evaporation of this solvent or b) evaporation of the reaction solvent, dissolving the polymer product in a suitable solvent and precipitating the polymer with a suitable non-solvent such as toluene or xylenes.

Polar groups incorporated in the polymers from the heterocyclic groups, the end groups and the amide/imide components strongly adsorb to metallic surfaces. The polymeric nature of the compositions coupled with high numbers of polar anchoring groups provide effective corrosion inhibition for metals and metal alloys by forming films exhibiting superior barrier properties over a broader range of pH, while remaining substantially impervious to corrosive agents present in aqueous systems and maintaining their anticorrosive effectiveness over repeated additions of oxidizing biocides and corrosive agents such as chlorine for extended time periods.

The corrosion inhibiting polymer compositions of the invention have the following advantages: improved chlorine resistance, low toxicity and environmental impact as compared to azoles such as TTA and BZT, a wide range of pH stability, formulated in safe and cost effective manner and are detected and monitored at ppm concentrations (also referred to as traceability). Improved chlorine resistance results in lower concentrations of metal ions such $Cu^{2+}$ discharged in to the aqueous system in compliance with EPA regulatory discharge restrictions, reduced galvanic corrosion, increased useful life of metallic components, reduced levels of polymer required for corrosion protection and elimination of odors associated with azoles. The low toxicity of the polymer compositions results in a lowered environmental impact as evidenced by relatively lower aquatic toxicological profiles. The polymer composition stability in a wide pH range allows for reductions or elimination of caustic providing reduced handling and shipping hazards. The polymers are made from inexpensive, commercially available monomer feedstocks and are easily formulated with other biocides, scale inhibitors and any other required additives known to be useful in treatment of aqueous systems. The heterocyclic group incorporated in the polymer provides a means to monitor low concentrations (ppm levels) of the polymer in the aqueous system via UV-vis absorption or fluorescence techniques, also referred to as traceability. An inert fluorescent tracer can also be incorporated in to the polymer as well to determine and monitor static and dynamic levels of the polymer in the aqueous system. The traceability of the polymers at ppm levels provides a means to detect the polymer concentration in the aqueous system and control the feed or dose rate required, resulting in significant cost performance. In practice, the amount of polymer compositions of Formula 1a or 1b used to treat the aqueous system varies according to the protective function required.

The polymer compositions of the present invention can preferably be added to the aqueous system at active amounts ranging between 0.1 to 50,000 ppm (0.00001 to 5 weight %), preferably from 1 to 500 ppm, most preferably from 1 to 100 ppm, based on the aqueous system.

The polymer compositions of this invention are used to prepare corrosion inhibiting formulations by combining the polymer with one or more additives known to be useful in treating aqueous systems such as for example biocidal compositions, any other corrosion inhibiting composition known in the art, scale inhibiting compositions, dispersants, defoamers, inert fluorescent tracers and combinations thereof.

To enhance their solubility and compatibility in formulations and fluid media, the corrosion inhibitors of the present invention can be formulated with surfactants, defoamers, co-solvents and hydrotropes or their pH can be altered with suitable acids or bases. Examples of suitable surfactants include but are not limited to Rhodafac® RS 610 or Rhodafac® RE 610 manufactured by Rhodia, Inc. Examples of suitable defoamers include but are not limited to GE silicone antifoam AF60. Suitable co-solvents include for example ethanol, isopropanol, ethylene glycol and propylene glycol. Suitable hydrotropes include Monatrope® 1250A manufactured by Uniqema, and sodium xylene sulfonate.

Suitable scale inhibitors include for example polyphosphates and polycarboxylic acids and copolymers such as described in U.S. Pat. No. 4,936,987.

The corrosion inhibitors of the present invention can also be used with other agents to enhance corrosion inhibition of copper, aluminum, mild steel, alloys of these and other metals. Examples of these agents include phosphates or phosphoric acid, polyphosphates such as tetrapotassium pyrophosphate and sodium hexametaphosphate, zinc, tolyltriazole, benzotriazole and other azoles, molybdate, chromate, phosphonates such as 1-hydroxyethylidene-1,1-diphosphonic acid, aminotris(methylene phosphonic acid), hydroxyphosphonoacetic acid and 2-phosphonobutane-1,2,4-tricarboxylic acid, polymeric corrosion inhibitors such as poly(meth)acrylic acid or polymaleic acid and copolymers of acrylic, methacrylic and maleic acid, as well as their alkali metal and alkaline earth metal salts.

In addition, the corrosion inhibitors may also be used with other agents such as scale inhibitors and dispersants. Examples of these agents include poly(meth)acrylic acid, polymaleic acid, copolymers of acrylic, methacrylic or maleic acid, phosphonates as previously described, and chelants such as nitrilotriacetic acid or ethylenediamine tetraacetic acid, as well as their metal salts. The agents described may be applied in a single formulation or applied separately.

The polymer compositions of the invention are usefully employed as fluid additives such as coolants, antifreezes, metal working fluids, lubricants, brake fluids, transmission fluids, aircraft de-icing fluids, fluids for polishing electronic devices (e.g. in chemical mechanical planarization (CMP) processes), soldering additives, anti-abrasive compounds, direct metal treatment fluids, cleaning agents and detergents for photographic processes, anti-corrosive coatings, caulks, sealants and pressure sensitive adhesives in contact with metallic components.

In a preferred embodiment, corrosion inhibiting compositions are usefully prepared in accordance with the present invention as fluid additives in contact with metallic components.

In an alternative embodiment, the corrosion inhibiting composition are prepared by techniques which are well known in the coatings art. First, if the composition is an elastomeric coating, caulk, sealant or pressure sensitive adhesive composition is to be pigmented, at least one pigment is well dispersed in an aqueous medium under high shear such as is afforded by a COWLES® mixer or, for more viscous compositions such as caulks and sealants, a high intensity mixer or mill. Then the waterborne polymer is added under lower shear stirring along with other elastomeric coating, caulk, sealant or pressure sensitive adhesive adjuvants as desired. Alternatively, the aqueous emulsion polymer may be included in the pigment dispersion step. The aqueous composition may contain conventional elastomeric coating, caulk, sealant or pressure sensitive adhesive adjuvants such as, for example, tackifiers, pigments, emulsifiers, coalescing agents, buffers, neutralizers, thickeners or rheology modifiers, humectants, wetting agents, biocides, plasticizers, antifoaming agents, colorants, waxes, and anti-oxidants.

The solids content of the aqueous coating composition may be from about 10% to about 85% by volume. The viscosity of the aqueous composition may be from 0.05 to 2000 Pa.s (50 cps to 2,000,000 cps), as measured using a Brookfield viscometer; the viscosities appropriate for different end uses and application methods vary considerably.

The oligomeric and polymeric corrosion inhibiting compositions may be applied by conventional application methods such as, for example, brushing and spraying methods such as, for example, roll coating, dipping doctor-blade application, printing methods, an aerosol, air-atomized spray, air-assisted spray, airless spray, high volume low pressure spray, air-assisted airless spray, caulk guns, and trowels.

In addition to metals, the polymeric corrosion inhibiting compositions may be applied to substrates including but not limited to for example, plastic including sheets and films, wood, previously painted surfaces, cementitious substrates, asphaltic substrates or the like, with or without a prior substrate treatment such as an acid etch or corona discharge or a primer.

The following examples are presented to illustrate the invention and the results obtained by the test procedures.

Abbreviations

AA=acrylic acid
BA=butyl acrylate
MMA=methyl methacrylate
AN=acrylonitrile
EHA=2-ethylhexyl acrylate
DI water=deionized water

EXAMPLES AND COMPARATIVE EXAMPLES

Preparation of Corrosion Inhibiting Compositions

Example 1

Synthesis of A

A mixture of 5 g succinic anhydride (0.05 mole) and 6.3 g 1-(3-aminopropyl)imidazole (API, 0.05 mole) is heated under reflux in 40 g of xylenes for 4 hours. Xylene is removed under reduced pressure, and the crude product is dissolved in chloroform and washed with 50 mL of 0.1% HCl. The chloroform layer is separated, dried with magnesium sulfate and the chloroform is removed under reduced pressure to give A. $^1$H NMR in CDCl$_3$: δ2.0(m, 2H, —CH$_2$—CH$_2$—CH$_2$—), 2.7(s, 4H, (CH$_2$—CO)$_2$=N—), 3.6 (t, 2H, —CH$_2$—N=(CO—CH$_2$)$_2$), 4.0(t, 2H, —CH$_2$-Imidazole), 7.0, 7.2, 7.6(s, 1H, imidazole ring).

Example 2

Synthesis of B

To 5 g of 2-octylsuccinic anhydride in 90 ml of toluene at 45° C. is added a solution of 3.2 g of API in 15 mL toluene. The reaction mixture is heated under reflux for 18 h. The toluene is removed under reduced pressure and the crude product is purified by liquid chromatography to give 4.5 g of B.

Example 3

Preparation of Polymer Containing Succinic Anhydride and Diisobutyl Groups (P1)

A 1.8 L reactor was charged with 150.8 g of maleic anhydride flakes, 485 g of dry reagent grade xylenes, 179.4 g diisobutylene and 0.3 g of p-toluene sulfonic acid. The reactor was sealed. It was flushed with nitrogen and a vacuum of −15 psig. was established. Heating to 160° C. was started and the initiator feed was prepared by dissolving 27.5 g of di-t-butylperoxide in 90 g of xylenes. When the reactor temperature had reached 160° C. the initiator solution was fed for 15 minutes at 2 g/min. Heating is stopped and the reaction is exothermic to 175° C. and 32 psig. The remaining initiator solution is added at 1 g/min for 85 min. During this time the reactor is maintained at 175–180° C. with stirring at 160 rpm. After the initiator feed is the heating is continued for 30 min. The reaction mixture is cooled and the reactor is drained at room temperature and pressure. This procedure gives 928 g of solution containing 35.2% solids. This solution (P1) is used for the functionalization process.

Example 4

Functionalization of Polymers Containing Succinic Anhydride and Diisobutyl Groups with 1-(3-aminipropyl)imidazole-synthesis of C-1 and C-2

To 20 g P1 is added slowly 5 g of API followed by 20 mL o-xylene. The reaction mixture is heated under reflux for 4 h and then allowed to cool to room temperature. The o-xylene layer is decanted and the o-xylene is removed under reduced pressure to give 1.5 g of C-1. The residue is dissolved in 50 mL acetone. The acetone and residual o-xylene is removed under reduced pressure to give 12 g of C-2.

Example 5

Functionalization of Polymers Containing Succinic Anhydride and Diisobutyl Groups with 1-(3-aminipropyl)imidazole-synthesis of D To a solution of 30 g of P1 is added 70 g of xylene. The solution is heated to 80° C. and 1-(3-aminopropyl)imidazole (4.64 g) is added dropwise. The reaction mixture is then heated under reflux for 4 hours and the water removed by a Dean and Stark condenser. After cooling the xylene is removed under reduced pressure at 70° C. To the residue in the flask is added methanol and the methanol is removed under reduced pressure at 65° C. To the residue in the flask is added 40 g of acetone is and the acetone is removed under reduced pressure at 60° C. to constant weight to afford the product D.

Example 6

Functionalization of Polymers Containing Succinic Anhydride and Diisobutyl Groups with 1-(3-aminipropyl)imidazole-synthesis of E and F To a mixture of 15 g of a solution P1 (45% solid) and 15 mL of xylene, a mixture of 3.38 g of API and 0.183 g ethanolamine is added slowly. The reaction is heated under reflux for 4 hours. It is cooled to room temperature. The xylene layer is decanted, and the xylene is removed under reduced pressure to obtain sample E. The precipitate remaining in the flask is dried under reduced pressure to obtain the product F.

Example 7

Functionalization of Polymers Containing Succinic Anhydride and Diisobutyl Groups with 1-(3-aminipropyl)imidazole-synthesis of G and H To a mixture of 10 g of a solution P1 (45% solid) and 15 mL of xylene, a mixture of 2.25 g of API and 0.298 g triethylene glycol monoamine is added slowly. The reaction is heated under reflux for 4 hours. It is cooled to room temperature. The xylene layer is decanted, and the xylene is removed under reduced pressure to obtain sample G. The precipitate remaining in the flask is dried under reduced pressure to obtain the product H.

Example 8

Functionalization of Polymers Containing Succinic Anhydride and Diisobutyl Groups with 1-(3-aminipropyl)imidazole-synthesis of I and J To a solution of 11.1 g of P1 (45% solids) and 75 mL of xylene is added 1.5 g of API, 1.1 g of β-alanine and 1.3 g of 1,4-diazabicyclo[5.4.0]undec-7-ene and the mixture heated under reflux for 4 hours. The mixture is cooled to room temperature. The xylene layer is decanted, and the xylene is removed under reduced pressure to obtain sample I. Methanol is added to the oil in the flask and the solution filtered. The methanol is removed under reduced pressure to give J.

Example 9

Functionalization of Polymers Containing Succinic Anhydride and Diisobutyl Groups with 1-(3-aminipropyl)imidazole-synthesis of K and L To a solution of 11.1 g of P1 (45% solids) and 70 mL of xylene, 1.5 g of API is added slowly and the reaction mixture heated under reflux for 4 hours, then cooled to room temperature. The xylene layer is decanted, and the xylene is removed under reduced pressure to obtain sample K. Methanol is added to the oil in the flask and the solution filtered. The methanol is removed under reduced pressure to give L.

Example 10

Preparation of Polymer Containing Succinic Anhydride Groups (P2)

To a 1-liter, 4-neck flask equipped with mechanical stirrer, a reflux condenser topped with nitrogen inlet, and a thermocouple, was added 200 g of maleic anhydride and 200 g of technical grade xylenes. After flushing the reactor with an inert gas, the contents are heated to 60° C. to dissolve the maleic anhydride and then 1.00 g of n-octylamine (NOA) is added. The stirred reactor contents are heated to reflux (140–145° C.) and 20.0 g of di-t-butylperoxide (DBP) in 167 g of xylenes is gradually added over two hours. The solution was maintained under reflux for two hours. The reactor is modified for vacuum distillation and xylenes are distilled off to obtain a solution of P2 at the desired concentration.

Example 11

Functionalization of P2-synthesis of M

To 6 g of P2 in 90 g xylenes is slowly added 5.35 g of API. The reaction is heated under reflux for 4 hours and the allowed to cool to room temperature. The xylene is removed under reduced pressure to obtain M.

Example 12

Functionalization of P2-synthesis of N

To 6.04 g of P2 in 90 g xylene, 1.74 g of 3-methyl-1-butylamine is added slowly at room temperature, and the reaction mixture is heated under reflux for 1 h and cooled to 100° C. and 2.5 g API is slowly added and the reaction mixture is again heated under reflux for 2 h. Xylene is removed under reduced pressure to obtain the final product N.

Example 13

Functionalization of P2-synthesis of O

To 7.2 g of P2 in 90 g xylene, 2.02 g of 2-methyl-1-pentylamine is added slowly into the solution at room temperature, then reaction mixture is heated under reflux for 2 h. The reaction mixture is cooled down to 100° C., and 2.5 g of API is added slowly into the reaction mixture and it is heated under reflux for 2 h. Xylene is removed under reduced pressure to obtain final product sample O.

Example 14

Functionalization of P2-synthesis of P

To 20 g of P2 in 80 g xylenes is slowly added 5.86 g of n-octylamine. The reaction mixture is heated under reflux for 2 h then cooled down to 100° C. and 11.3 g of API is slowly added. The reaction is then heated under reflux for an additional 2 h, then cooled and the xylene is removed under reduced pressure to give P.

Example 15

Functionalization of P2-synthesis of Q

To a solution of 80 g of P2 in 80 g dioxane heated to 60° C. is slowly added a solution of 26.2 g of API in 25 g. of dioxane. After cooling, 80 g of water is added to dissolve the solids. The resulting solution is concentrated to 50% solids to give Q.

Example 16

Functionalization of P2-Synthesis of R

A solution of 50 g of P2 in 40 g ethanol is hydrolyzed with 31.6 g of a 50% ethanolic solution of NaOH. After adjusting the pH to 6.3, 20 g of API is added and the reaction mixture heated under reflux for 20 h. After cooling the reaction mixture is concentrated and 158 g of water is added to obtain R as a 47% aqueous solution.

Example 17

Functionalization of P1-Synthesis of S

To a solution of 10.5 g P1 and 30 mL xylene at room temperature is slowly added 2.6 g of 3-(aminomethyl)-pyridine. The reaction mixture is heated under reflux for 4 h and allowed to cool to room temperature. The xylene is removed under reduced pressure to give 8.4 g of S.

Example 18

Functionalization of P1 at Room Temperature-Synthesis of T

To a solution of 7.3 g of P1 in ethylbenzene at 50° C. is added 4.4 g of API. The reaction mixture is heated under reflux for 2 h. The solvent is removed under reduced pressure and the solids washed with ethylbenzene to give 5.4 g of T.

Example 19

Functionalization of P1 at Room Temperature-Synthesis of U

To a solution of 20 g of P1 in 75 g of dioxane is slowly added a solution of 5 g API (0.04 moles) in 35 g of dioxane over 90 minutes. The reaction mixture is heated to 60° C. for 15 minutes and cooled to room temperature. The solid is filtered off and washed with acetone, then dried in a vacuum oven to afford U.

Example 20

Functionalization of a Poly(Maleic Anhydride-Limonene) with API-Synthesis of V

To a solution of 1.5 g of the polymer poly(maleic anhydride-limonene) in 50 mL acetone is added 0.8 g of API. The reaction mixture was stirred for 4 h. The acetone was removed under reduced pressure to give V as a white solid.

Example 21

Functionalization of Poly(Maleic Anhydride-alt-1-octadecene) with API-Synthesis of W To a solution of 5.0 g of the polymer poly(maleic anhydride-alt-1-octadecene) (Aldrich) in 50 mL xylene at room temperature is slowly added 1.8 g of API. The reaction mixture is heated under reflux for 2 h and the water collected in a Dean and Stark condenser. The xylene is removed under reduced pressure to give 6.4 g of W.

Example 22

Functionalization of Poly(Maleic Anhydride-alt-1-tetradecene) with API-Synthesis of X To a solution of 10.0 g of the polymer poly(maleic anhydride-alt-1-tetradecene) (Aldrich) in 50 mL xylene at room temperature is slowly added 3.8 g of API. The reaction mixture is heated under reflux for 2 h and the water collected in a Dean and Stark condenser. The xylene is removed under reduced pressure to give 13 g of X.

Example 23

Preparation of Polymer Containing Maleic Anhydride and Vinyl Acetate Groups (P3)

A 4-neck round bottom flask containing 220 g of toluene is heated to 75° C. and 6.3 g of maleic anhydride and 0.46 g of Lupersol-11 is added. The solution is heated to 85° C. and a solution of 25.4 g of maleic anhydride, 28.5 g vinyl acetate, and 2.64 g of Lupersol-11 is added over 2 h. After the addition is complete the reaction mixture is kept at 85° C. for 1 h. A solution of 0.5 g of Lupersol-11 in 2 g toluene is added and the heating continued for an additional 1 h. The reaction is cooled to give a solution of P3 containing 19.4% solids.

Example 24

Functionalization of Poly(Maleic Anhydride-alt-vinylacetate) with API-Synthesis of Y To 16.5 g of P3 (19.4% solids) in a 300 mL 3-neck round bottom flask is added 20 g of toluene. The reaction mixture is then heated to 50° C. and 1.3 g of API in 10 g of toluene is added slowly. The reaction mixture is then heated under reflux for 16 h. The reaction is cooled and the toluene decanted off. The solid residue is dried under vacuum to give Y.

Example 25

Functionalization of Poly(Styrene-maleic Anhydride) with API-Synthesis of Z

To a solution of 10 g of SMA-1000 in 60 g Dioxane at 60° C., is added slowly 6.2 g of API. The reaction mixture is heated under reflux for 30 minutes, and all the dioxane is removed by distillation. 60 g of fresh dioxane is added and the reaction mixture is heated under reflux for 10 minutes. The reaction is cooled to room temperature. The precipitate is filtered, and it is dried in a vacuum oven at 75° C. for 3 h. Any excess API is removed from the solid by washing with acetone to give 16 g of Z.

Example 26

Functionalization of Poly(Maleic Anhydride-methylvinylether) with API-Synthesis of AA To a mixture of 10 g of the polymer poly(maleic anhydride-methylvinylether) (Gantrez AN-119) and 90 g dimethylformamide (DMF) is slowly added 12 g of API. The reaction mixture is heated under reflux for 4 hours, and the DMF is removed under reduced pressure. The crude product is dissolved in 500 mL of methanol. The methanol solution is washed with 80 g Amberlyst-15 resin. The solvents are removed under reduced pressure to give 10 g of AA.

Example 27

Functionalization of Poly(Maleic Anhydride-butylvinylether) with API-Synthesis of BB To a solution of 4.95 g of the polymer poly(maleic anhydride-butylvinylether) in 45 g o-xylene is slowly added 3.125 g of API. The reaction is heated under reflux for 4 h, and then the o-xylene is removed under reduced pressure to obtain 7.4 g of BB.

Example 28

Functionalization of Poly(Maleic Anhydride-methoxyethyl Vinylether) with API-Synthesis of CC To a solution of 10 g of the polymer poly(maleic anhydride-methoxyethylvinylether) in 90 g DMF is slowly added 9.4 g API. The reaction mixture is heated under reflux for 4 h. The DMF is removed under reduced pressure. The crude product is dissolved in 20 mL of methanol and the product is precipitated by adding 500 mL of diethyl ether. The precipitate is dissolved into 500 mL methanol, and the methanol solution is washed with Amberlyst-15 to remove unreacted API. The methanol is removed under reduced pressure to give 15 g of CC.

Example 29

Functionalization of Poly(Maleic Anhydride-vinylacetate) with API-Synthesis of DD Into a 300 mL 3-neck round bottom flask is introduced 62 g (0.052 mole) of ethoxylated P3. To this is added 30 g of toluene and the reaction mixture heated to 55° C. A solution of 5.9 g of API in 10 g of ethanol is then slowly added. After the addition is complete the reaction mixture is heated under reflux for 26 h. Upon cooling, solids separated out. The solvent was decanted off and the residue was dried to obtain DD.

Example 30

Functionalization of Poly(Styrene-maleic Anhydride) with API-Synthesis of EE

To a solution of 50 g SMA-1000 in 100 g of acetonitrile at 55° C. is added 40 g of an ethanol/water (1:1) mixture and the pH is adjusted to >5 with aqueous NaOH. To this mixture is added 20 g of API. The reaction mixture is heated under reflux for 15 h. Distillation is carried out to remove solvent. This affords EE as an aqueous solution.

Example 31

Synthesis of FF

Separate solutions of 0.3 g of Lubrizol-1 in 15 mL isopropanol (initiator solution) and 5 g 1-(4'-vinylbenzyl) imidazole in 12 g acrylic acid (monomer solution) are prepared. To 17 mL isopropanol at 80° C., the initiator solution is added at 10 mL/hr. Simultaneously the monomer solution is added at 20 mL/hr. Just before the additions are complete, 0.15 g of Lubrizol-11 is added into the reaction mixture and the reaction is held at 80° C. for 35 min. and then allowed to cool to room temperature. The precipitate is washed with 250 mL isopropanol to give FF.

Example 32

Synthesis of Poly(91.3 Parts Acrylic Acid –8.7 parts 1-acryloylbenzotriazole) GG Separate solutions of 0.4 g of Lubrizol-11 in 20 mL isopropanol (initiator solution) and 17 g 1-acrylobenzotriazole in 73.6 g acrylic acid (monomer solution) are prepared. To 100 mL isopropanol at 80° C., the initiator solution is added at 10 mL/hr. Simultaneously the monomer solution is added at 24 mL/hr. Just before the additions are complete, 0.15 g of Lubrizol-11 is added into the reaction mixture and the reaction is held at 80° C. for 35 minutes and then allowed to cool to room temperature. The isopropanol is removed under reduced pressure to give GG.

Example 33

Synthesis of a Copolymer of Acrylic Acid and 1-(3-(2-hydroxypropylallylether))benzotriazole HH To a solution of 26 g of 1-(3-(2-hydroxypropylallylether)) in 125 g isopropanol at 82° C. is added a solution of acrylic acid and Lupersol-11 over 2 hours with the temperature maintained at 84° C. After the addition is complete, the reaction is heated for 2 h and water is added and the pH is adjusted to 5.2. The isopropanol-water azeotrope is distilled off to give HH as an aqueous solution containing 36% active material.

Example 34

Synthesis of II

Fifty grams of xylene is charged in a reactor followed by 9.8 g (0.1 moles) of maleic anhydride. The mixture is heated to 125° C. A solution of 10.8 g (0.1 moles) of allylimidazole in 10 g of xylene and a solution of 0.4 g of Lubrizol-11 in 20 g of xylene are simultaneously fed to the reactor for 1 h. After the addition is complete, the heating is continued for 30 minutes. The reaction mixture is cooled to room temperature and the solvent is removed under reduced pressure to give II.

Example 35

Synthesis of JJ

To 135 g of xylenes at 95° C. is fed a mixture of di-isobutylene (40%), ethyl acrylate (20%), and vinylimidazole (40%) in xylenes containing 2.5% AIBN as the initiator. After the feed (2.5 h) the reaction is heated for 30 minutes. After cooling the solid polymer is precipitated out by adding ether. The solid is then hydrolyzed with concentrated HCl. After distillation, JJ is obtained as a clear solution.

Example 36

Synthesis KK

Butyl acrylate polymer (Mw/Mn=2370/1250; 51.2 g) with terminal unsaturation is charged to a 100 mL 3-neck reactor flask and 13.6 g of imidazole (0.2 moles) is slowly added at room temperature. The reaction mixture is heated to 120° C. for 2 hours and cooled to room temperature. Water is added followed by diethyl ether to remove excess imidazole. The diethyl ether layer is separated and filtered and the ether removed under reduced pressure to give KK.

Example 37

Synthesis of LL

To a solution of 20 g (0.156 moles) of butyl acrylate polymer (Mw/Mn=2370/1250) in 20 g of acetone is slowly added 9.8 g of API (0.078 moles) for a period of 1 hour. After the addition is complete, the mixture is stirred for 1 hour. Removal of solvent under reduced pressure affords LL.

Example 38

Synthesis of MM

A mixture of 17 g (0.03 moles) of acrylic acid/butyl acrylate copolymer and 1.12 g of API is placed in a Parr bomb reactor. The bomb is heated at 180° C. for 4 h. The reaction mixture is then dialyzed with a YM-2 filter to remove the unreacted API to afford MM.

Corrosion Resistance Testing

The following procedure was utilized to determine the corrosion resistance of the polymer compositions of the invention under conditions of chlorination. This test places emphasis on the ability of the corrosion inhibiting polymer compositions to resist penetration of chlorine through the adsorbed film on a copper surface.

Formulation Stock Solution

A stock solution was prepared containing 1000 ppm of phosphoric acid (as $PO_4^{3-}$, 1.21 g of 85% $H_3PO_4$), 625 ppm of 1-hydroxyethylidene-1,1-disphosphonic acid (as $PO_4^{3-}$, 1.13 g of 60% HEDP, Dequest® 2010, Solutia) and 625 ppm of Acumer® 2000 copolymer supplied at 39.5% actives by Rohm and Haas Company (1.58 g). To complete the stock solution, water was added to the mixture to afford a total weight of 998 g. The pH was adjusted to 10.5 and then 1000 ppm tetrapotassium pyrophosphate (as $PO_4^{3-}$, 1.74 g of TKPP) was added. The pH of the final mixture was adjusted to 11.0.

Polymer Stock Solution

Each polymer was prepared as 1000 ppm (as actives) in an appropriate solvent (water, methanol or isopropanol).

Preparation of a Test Solution

To a container was added the following:

(a) 125 mL of an aqueous solution containing 500 ppm NaCl, 200 ppm $CaCl_2$ (as $CaCO_3$), 100 ppm $MgCl_2$ (as $CaCO_3$), 400 ppm total alkalinity (as $CaCO_3$), adjusting the solution to pH 7.0;

(b) 1 mL of formulation stock solution; and (c) 0.38 g of polymer stock solution (resulting in 3 ppm actives)

wherein the solution is maintained at pH 7.0.

Preparation of Test Apparatus

Stainless steel reference electrode-sand with 600 grit SiC paper, rinse with water, rinse with isopropanol, rinse with water, towel dry.

18 gauge copper working electrode-sand with 600 grit SiC paper, rinse with water, rinse with isopropanol, rinse with water, rinse with acetone then air dry.

Two stainless steel wires and one copper wire were inserted into the container containing 125 mL of test solution, anchoring the wires through a lid on top of the container. The copper wire is bent into a loop so that the volume/surface area of water to copper is 264 mL/in². The test solution was stirred at 300 rpm at room temperature for 18 h. After 18 h, 5 ppm NaOCl was added (as $Cl_2$). After 30 minutes, corrosion rate was measured as mil per year (mpy) using an EG&G Princeton Applied Research Potentiostat/Galvanostat Model 273.

For test without chlorine, the above procedure was used with the following conditions substituted where appropriate: NaCl (1000 ppm), Ca/Mg (100 ppm/50 ppm as $CaCO_3$), volume/surface area 492 mL/in², 4 h polymer film formation time (unstirred).

TABLE I

CORROSION INHIBITING COMPOSITIONS AND COMPARATIVE EXAMPLES

| Example | Sample | mpy (3 ppm) | mpy (3 ppm) with NaOCl |
|---|---|---|---|
| Comparative | None | 3.42 | 3.09 |
| Comparative | Cobratec TT-100 PMC | 0.05 | 1.24 |
| Comparative | Cobratec 99 PMC | 0.02 | 2.16 |
| 1 | A | — | 1.70 |
| 2 | B | — | 1.88 |
| 4 | C-1 | 0.16 | 0.34 |
|  | C-2 | 0.42 | 0.59 |
| 5 | D | — | 0.31 |
| 6 | E | — | 0.85 |
|  | F | — | 1.16 |
| 7 | G | — | 0.42 |
|  | H | — | 1.33 |
| 8 | I | — | 0.36 |
|  | J | — | 0.54 |
| 9 | K | — | 0.34 |
|  | L | — | 1.00 |
| 11 | M | — | 0.84 |
| 12 | N | — | 0.50 |
| 13 | O | — | 0.37 |

TABLE I-continued

CORROSION INHIBITING COMPOSITIONS AND
COMPARATIVE EXAMPLES

| Example | Sample | mpy (3 ppm) | mpy (3 ppm) with NaOCl |
|---|---|---|---|
| 14 | P | — | 0.15 |
| 15 | Q | — | 2.06 |
| 16 | R | — | 1.16 |
| 17 | S | — | 0.98 |
| 18 | T | — | 1.14 |
| 19 | U | — | 1.10 |
| 20 | V | — | 1.95 |
| 21 | W | — | 2.37 |
| 22 | X | — | 4.83 |
| 24 | Y | — | 2.70 |
| 25 | Z | — | 2.72 |
| 26 | AA | — | 2.04 |
| 27 | BB | — | 2.27 |
| 28 | CC | — | 1.08 |
| 29 | DD | — | 2.04 |
| 30 | EE | — | 1.24 |
| 31 | FF | 0.44 | 2.36 |
| 32 | GG | 0.63 | 2.83 |
| 33 | HH | — | 2.70 |
| 34 | II | — | 2.61 |
| 35 | JJ | — | 2.49 |
| 36 | KK | 0.64 | 0.97 |
| 37 | LL | — | 4.30 |
| 38 | MM | — | 1.39 |

As Table I shows, the best performance in terms of corrosion resistance and chlorine resistance was obtained for several classes of polymers. A copolymer of maleic anhydride and diisobutylene post functionalized with aminopropyl imidazole (Examples 4 and 5) performed better than TTA, BZT with regard to chlorine resistance (Comparative examples 1 and 2) and favorably with regard to corrosion rate. Polymers of formula III–V (Examples 6–9, 12–14) performed better than TTA, BZT with regard to chlorine resistance. Overall, most of the examples were comparable to TTA and BZT in terms of chlorine resistance, confirming that they are attractive alternatives to TTA and BZT.

What is claimed is:

1. A polymer comprising at least one repeating unit of Formula Ia:

Formula Ia

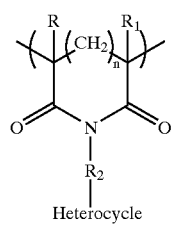

Heterocycle wherein n is 0 or 1; R and $R_1$ are independently selected from the group consisting of hydrogen, methyl, and $C_2$–$C_4$ alkyl; $R_2$ is selected from the group consisting of $C_1$–$C_8$ branched and straight chain alkyl groups, $C_1$–$C_8$ branched and straight chain alkenyl groups, $C_3$–$C_8$ cyclic alkyl groups, $C_2$–$C_4$ alkylene oxide groups and poly($C_2$–$C_4$ alkylene)m oxides wherein m=2–20; a pendant heterocycle comprising unsaturated or aromatic heterocycles having one or more hetero atoms selected from the group N, O, S and combinations thereof, the pendant heterocycle chemically bonded to the $R_2$ group via a hetero atom which is part of the heterocycle or a carbon atom of the heterocycle; $R_3$ is selected from the group consisting of hydrogen, methyl, ethyl, $C_3$—$C_{18}$ branched and straight chain, alkyl and alkenyl groups; and $R_4$ is selected from the group consisting of H, $CH_3$, $C_2H_5$, $C_6H_5$ and $C_3$–$C_{18}$ branched and straight chain alkyl groups and $C_3$–$C_{18}$ alkenyl groups.

2. The polymer according to claim 1 further comprising polymerized units of one or more ethylenically unsaturated monomer of the Formula:

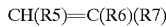

CH(R5)=C(R6)(R7)

wherein $R_5$ is selected from the group consisting of hydrogen, phenyl, methyl, ethyl, $C_3$–$C_{18}$ branched and straight chain, alkyl and alkenyl groups; $R_6$ is independently selected from the group consisting of hydrogen, methyl, ethyl, phenyl, $C_3$–$C_{18}$ branched and straight chain alkyl groups, $C_3$–$C_{18}$ alkenyl groups, $OR_8$ and $CH_2OR_8$ wherein $R_8$ is selected from the group consisting of acetate, glycidyl, methyl, ethyl, $C_3$–$C_{18}$ branched and straight chain alkyl groups, $C_3$–$C_{18}$ alkenyl groups, and groups having the formula $[CH_2CH(R_a)O]_mR_b$ wherein $R_3$ is hydrogen, methyl, ethyl or phenyl, m is an integer from 1–20 and $R_b$ is independently hydrogen, methyl, ethyl, phenyl and benzyl; and $R_7$ is selected from the group consisting of H, $CH_3$, $C_6H_5$, CN, $COR_9$ wherein $R_9$ is OH, $NH_2$, $OR_8$ wherein $R_8$ is described previously and $NR_cR_d$ wherein $R_c$ and $R_d$ are the same group or different groups, are parts of a 5-membered or 6-membered ring system, hydrogen, hydroxymethyl, methoxy methyl, ethyl and $C_3$–$C_{18}$ branched and straight chain alkyl and alkenyl groups.

3. The polymer according to claim 2 wherein the ethylenically unsaturated monomer is selected from the group consisting of maleic anhydride, itaconic anhydride, cyclohex-4-enyl tetrahydrophthalic anhydride, ethylene, propylene, butylene, isobutylene, propylene tetramer ($C_{12}$–$C_{14}$), propylene dimer trimer ($C_{18}$–$C_{22}$), 1-butene, 1-octene, 1-decene, styrene, α-methyl styrene, hydroxy styrene, styrene sulfonic acid, butadiene, vinyl acetate, vinyl butyrate, vinyl esters, vinyl chloride, vinylidene chloride, stilbene, divinyl benzene, (meth)acrylic acid, $C_3$–$C_{18}$ (meth) acrylate esters, $C_3$–$C_{18}$ (meth)acrylamides and (meth) acrylonitrile.

4. A polymer comprising one or more repeating units of a functionalized imide component having Formula Ia and a functionalized bride component having Formula Ib:

Formula Ia

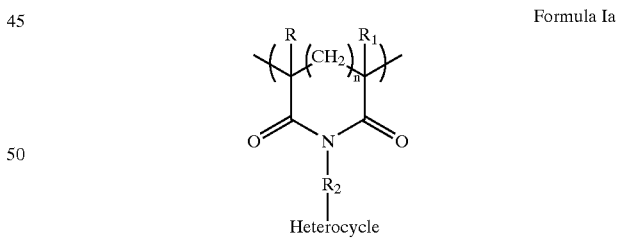

Heterocycle

Formula Ib

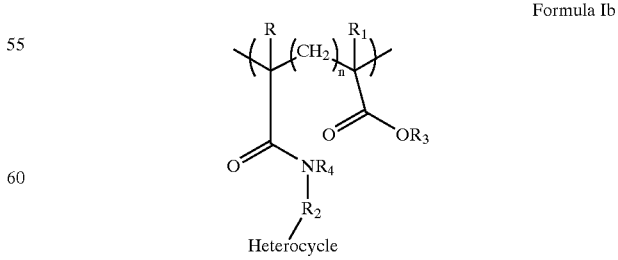

Heterocycle wherein n is 0 or 1; R and $R_1$ are independently selected from the group consisting of hydrogen, methyl, and $C_2$–$C_4$ alkyl; $R_2$ is selected from the group consisting of $C_1$–$C_8$ branched and straight chain alkyl groups, $C_1$–$C_8$ branched and straight chain alkenyl groups, $C_3$–$C_8$ cyclic alkyl groups, $C_2$–$C_4$ alkylene oxide groups and poly($C_2$–$C_4$ alkylene)m oxides wherein m=2–20; a pendant heterocycle comprising unsaturated or aromatic heterocycles having one or more hetero atoms selected from the group N, O, S and combinations thereof, the pendant heterocycle chemically bonded to the $R_2$ group via a hetero atom which is part of the heterocycle or a carbon atom of the heterocycle; $R_3$ is selected from the group consisting of hydrogen, methyl, ethyl, $C_3$–$C_{18}$ branched and straight chain, alkyl and alkenyl groups; and $R_4$ is selected from the group consisting of H, $CH_3$, $C_2H_5$, $C_6H_5$, $C_3$–$C_{18}$ branched and straight chain alkyl groups and $C_3$–$C_{18}$ alkenyl groups.

5. A corrosion inhibiting polymer comprising chemical components A, B and C; wherein A optionally includes one or more end groups selected from initiator fragments, chain transfer fragments, solvent fragments and combinations thereof; wherein B includes at least one repeating unit selected from a functionalized imide component of Formula Ia, a functionalized amide component of Formula Ib and combinations of Ia and Ib; and wherein C represents one or more ethylenically unsaturated monomers of Formula II:

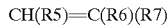  Formula II wherein $R_5$ is selected from hydrogen, phenyl, methyl, ethyl, $C_3$–$C_{18}$ branched and straight chain alkyl and alkenyl groups; $R_6$ is independently selected from hydrogen, methyl, ethyl, phenyl, $C_3$–$C_{18}$ branched and straight chain alkyl and alkenyl groups, $OR_8$ and $CH_2OR_8$ wherein $R_8$ is acetate, glycidyl, methyl, ethyl, $C_3$–$C_{18}$ branched and straight chain alkyl and alkenyl groups, and groups having the formula $[CH_2CH(R_a)O]_mR_b$ wherein $R_a$ is hydrogen, methyl, ethyl, and phenyl, m is an integer from 2–20 and $R_b$ is independently hydrogen, methyl, ethyl, phenyl and benzyl; and $R_7$ is independently selected from H, $CH_3$, $C_2H_5$, CN, a $COR_9$ wherein $R_9$ is OH, $NH_2$, $OR_8$ group wherein $R_8$ is described previously and a $NR_cR_d$ wherein $R_c$ and $R_d$ are the same group or different groups, are parts of a 5-membered or 6-membered ring system, hydrogen, hydroxymethyl, methoxy methyl, ethyl and $C_3$–$C_{18}$ branched and straight chain alkyl and alkenyl groups branched and straight chain alkyl and alkenyl groups.

6. The polymer according to claim 5 wherein A is selected from the group consisting of dialkyl peroxides, alkyl hydroperoxides, n-dodecyl isopropyl alcohol, alkyl phosphonates, alkyl phosphites, aryl phosphinic acids, alkyl phosphinic acids, hypophosphites, aldehydes, formates, toluene, xylenes, $C_9$–$C_{10}$ alkylaromatics, and Aromatic 100.

7. The polymer according to claim 5 wherein the polymer is of Formula:

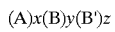

wherein A is a fragment selected from group consisting of alkyl aromatic compounds, toluene, xylene, $C_9$–$C_{10}$ alkyl substituted aromatic hydrocarbons, Aromatic 100 and combinations thereof; wherein B is a selected from succinimide, glutarimide and combinations thereof; and wherein B' includes at least one repeating unit selected from a functionalized imide component having Formula Ia or a functionalized amide component having Formula Ib, each B' component having a pendant group including $C_1$–$C_{18}$ branched or straight chain alkyl or aryl, saturated or unsaturated amine groups, amide groups, carboxylic acid groups or alcohol groups and combinations thereof, selected from succinimide, glutarimide and combinations thereof; and wherein x, y, z are integers values chosen such that (y+z)/x is greater than 2.

8. The polymer according to claim 5 wherein the pendant heterocycle is selected from the group consisting of imidazole, triazoles and their respective isomers, thiophene, pyrrole, oxazole, thiazoles and their respective isomers, pyrazole, substituted thiazoles and their respective isomers, tetrazole, pyridine, pyridazine, pyrimidine, pyrazine, and combinations thereof.

9. The polymer according to claim 5 wherein C is selected from the group consisting of maleic anhydride, itaconic anhydride, cyclohex-4-enyl tetrahydrophthalic anhydride, ethylene, propylene, butylene, isobutylene, di-isobutylene, propylene tetramer ($C_{12}$–$C_{14}$), propylene dimer trimer ($C_{18}$–$C_{22}$), 1-butene, 1-octene, 1-decene; styrene, α-methyl styrene, hydroxy styrene, styrene sulfonic acid, butadiene; vinyl acetate, vinyl butyrate, vinyl esters, vinyl chloride, vinylidene chloride, stilbene, divinyl benzene, (meth)acrylic acid, $C_3$–$C_{18}$ (meth)acrylate esters, $C_3$–$C_{18}$ (meth)acrylamides and (meth)acrylonitrile.

10. A corrosion inhibiting formulation for metals comprising at least one polymeric corrosion inhibiting compositions of claim 1 and one or more additives selected from the group consisting of biocides, scale inhibitors, corrosion inhibitors, surfactants, defoamers, inert fluorescent tracers and combinations thereof.

* * * * *